United States Patent
Holub et al.

(10) Patent No.: US 11,995,511 B2
(45) Date of Patent: May 28, 2024

(54) METHODS AND ARRANGEMENTS FOR LOCALIZING MACHINE-READABLE INDICIA

(71) Applicant: Digimarc Corporation, Beaverton, OR (US)

(72) Inventors: Vojtech Holub, Lafayette, CO (US); Tomas Filler, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/896,878

(22) Filed: Jun. 9, 2020

(65) Prior Publication Data

US 2020/0410312 A1    Dec. 31, 2020

Related U.S. Application Data

(63) Continuation-in-part of application No. 16/270,500, filed on Feb. 7, 2019, now Pat. No. 10,958,807.
(Continued)

(51) Int. Cl.
*G06K 9/00* (2022.01)
*G06K 7/14* (2006.01)
(Continued)

(52) U.S. Cl.
CPC ......... *G06K 7/1443* (2013.01); *G06K 7/1413* (2013.01); *G06K 7/1417* (2013.01);
(Continued)

(58) Field of Classification Search
CPC ....... G06K 19/06037; G06K 19/06028; G06K 7/1417; G06K 7/1413; G06K 9/40;
(Continued)

(56) References Cited

U.S. PATENT DOCUMENTS 933,227 A    9/1909    Billau
5,181,254 A    1/1993    Schweizer
(Continued)

FOREIGN PATENT DOCUMENTS

EP    2874100 A2    5/2015
EP    3098757 A1 *    11/2016    ......... G06K 7/10732
(Continued)

OTHER PUBLICATIONS

An Intelligent Algorithm for Utilizing a Low Cost Camera as an Inexpensive Barcode Reader, Ruwan Janapriya et al., SLAAI, Sep. 16, 2003, pp. 30-35 (Year: 2003).*
(Continued)

*Primary Examiner* — Jayesh A Patel
(74) *Attorney, Agent, or Firm* — Digimarc Corporation

(57) ABSTRACT

The present technology relates to image signal processing. One aspect of the present technology involves analyzing reference imagery gathered by a camera system to determine which parts of an image frame offer high probabilities of—relative to other image parts—containing decodable watermark data. Another aspect of the present technology whittles-down such determined image frame parts based on detected content (e.g., a cereal box) vs expected background within such determined image frame parts.

8 Claims, 14 Drawing Sheets
(8 of 14 Drawing Sheet(s) Filed in Color)

Related U.S. Application Data

(60) Provisional application No. 62/861,961, filed on Jun. 14, 2019, provisional application No. 62/628,510, filed on Feb. 9, 2018, provisional application No. 62/628,223, filed on Feb. 8, 2018.

(51) Int. Cl.
*G06K 19/06* (2006.01)
*G06T 1/00* (2006.01)
*G06T 3/40* (2006.01)
*G06T 7/73* (2017.01)
*G06V 10/20* (2022.01)
*G06V 10/30* (2022.01)
*G06V 10/32* (2022.01)
*H04N 23/56* (2023.01)

(52) U.S. Cl.
CPC . *G06K 19/06028* (2013.01); *G06K 19/06037* (2013.01); *G06T 1/005* (2013.01); *G06T 3/40* (2013.01); *G06T 7/73* (2017.01); *G06V 10/255* (2022.01); *G06V 10/30* (2022.01); *G06V 10/32* (2022.01); *G06T 2201/0065* (2013.01); *G06T 2201/0083* (2013.01); *G06T 2207/20224* (2013.01); *H04N 23/56* (2023.01)

(58) Field of Classification Search
CPC ...... G06K 9/42; G06K 9/3241; G06K 7/1443; G06T 3/40; G06T 7/73; G06T 1/005; G06T 2201/0083; G06T 2207/20224; G06T 2201/0065; G06T 1/0028; G06T 2201/0061; G06T 2201/0051; G06T 1/0078; H04N 5/2256; H04N 1/32144
See application file for complete search history.

(56) References Cited

U.S. PATENT DOCUMENTS

| | | | |
|---|---|---|---|
| 5,756,981 A * | 5/1998 | Roustaei | G06K 7/10732 235/462.07 |
| 6,122,403 A | 9/2000 | Rhoads | |
| 6,141,438 A | 10/2000 | Blanchester | |
| 6,141,456 A * | 10/2000 | Pearlstein | H04N 19/59 375/E7.206 |
| 6,256,343 B1 | 7/2001 | Suzuki | |
| 6,335,985 B1 | 1/2002 | Sambonsugi | |
| 6,345,104 B1 | 2/2002 | Rhoads | |
| 6,366,680 B1 | 4/2002 | Brunk | |
| 6,424,725 B1 | 7/2002 | Rhoads | |
| 6,442,284 B1 | 8/2002 | Gustafson | |
| 6,516,079 B1 | 2/2003 | Rhoads | |
| 6,590,996 B1 | 7/2003 | Reed | |
| 6,614,914 B1 | 9/2003 | Rhoads | |
| 6,625,297 B1 | 9/2003 | Bradley | |
| 6,912,295 B2 | 6/2005 | Reed | |
| 6,947,571 B1 | 9/2005 | Rhoads | |
| 6,988,202 B1 | 1/2006 | Rhoads | |
| 6,996,256 B2 | 2/2006 | Pavlidis | |
| 7,013,021 B2 | 3/2006 | Sharma | |
| 7,046,819 B2 | 5/2006 | Sharma | |
| 7,054,461 B2 | 5/2006 | Zeller | |
| 7,076,082 B2 | 7/2006 | Sharma | |
| 7,116,824 B2 | 10/2006 | Plaza | |
| 7,206,820 B1 | 4/2007 | Rhoads | |
| 7,231,061 B2 | 6/2007 | Bradley | |
| 7,286,685 B2 | 10/2007 | Brunk | |
| 7,503,490 B1 | 3/2009 | Bobbitt | |
| 7,508,944 B1 * | 3/2009 | Brunk | G06T 1/005 380/252 |
| 7,574,014 B2 | 8/2009 | Sharma | |
| 7,639,840 B2 | 12/2009 | Hanna | |
| 7,720,249 B2 | 5/2010 | Rhoads | |
| 7,978,875 B2 | 7/2011 | Sharma | |
| 7,986,807 B2 | 7/2011 | Stach | |
| 8,488,881 B2 | 7/2013 | Feris | |
| 8,608,073 B2 * | 12/2013 | Baqai | G06K 7/1456 235/462.04 |
| 8,923,628 B2 | 12/2014 | Fukui | |
| 8,991,707 B2 * | 3/2015 | Vinogradov | G06K 7/10732 235/462.43 |
| 9,332,275 B2 | 5/2016 | Watanabe | |
| 9,380,186 B2 | 6/2016 | Reed | |
| 9,401,001 B2 | 7/2016 | Reed | |
| 9,449,357 B1 | 9/2016 | Lyons | |
| 9,521,291 B2 * | 12/2016 | Holub | H04N 1/32352 |
| 9,635,378 B2 | 4/2017 | Holub | |
| 9,747,656 B2 | 8/2017 | Stach | |
| 9,842,163 B2 | 12/2017 | Sharma | |
| 9,892,301 B1 | 2/2018 | Holub | |
| 9,922,220 B2 | 3/2018 | Evans | |
| 9,984,429 B2 | 5/2018 | Holub | |
| 10,147,156 B2 | 12/2018 | Boles | |
| 10,198,648 B1 | 2/2019 | Bradley | |
| 10,242,434 B1 | 3/2019 | Holub | |
| 10,424,038 B2 | 9/2019 | Holub | |
| 10,506,128 B1 | 12/2019 | Chadwick | |
| 10,593,007 B1 | 3/2020 | Long | |
| 10,664,722 B1 | 5/2020 | Sharma | |
| 10,958,807 B1 * | 3/2021 | Holub | G06K 7/1443 |
| 2002/0070858 A1 | 6/2002 | Gutta | |
| 2003/0063802 A1 | 4/2003 | Li | |
| 2003/0112997 A1 * | 6/2003 | Ahmed | H04N 1/32288 382/100 |
| 2003/0194145 A1 | 10/2003 | Chiba | |
| 2003/0210330 A1 | 11/2003 | Wiseman | |
| 2004/0023397 A1 * | 2/2004 | Vig | G06K 1/121 436/1 |
| 2004/0247154 A1 | 12/2004 | Bodo | |
| 2005/0069208 A1 | 3/2005 | Morisada | |
| 2005/0089246 A1 | 4/2005 | Luo | |
| 2005/0259849 A1 | 11/2005 | Pavlidis | |
| 2006/0018521 A1 | 1/2006 | Avidan | |
| 2006/0060653 A1 * | 3/2006 | Wittenberg | G06K 7/10811 235/462.01 |
| 2006/0110014 A1 | 5/2006 | Philomin | |
| 2006/0126938 A1 | 6/2006 | Lee | |
| 2006/0218126 A1 * | 9/2006 | De Ruijter | G06F 16/68 |
| 2007/0140571 A1 | 6/2007 | Fan | |
| 2007/0183626 A1 * | 8/2007 | Hashimoto | H04N 1/32203 382/100 |
| 2008/0181499 A1 | 7/2008 | Yang | |
| 2008/0247599 A1 * | 10/2008 | Porikli | G06V 20/52 382/103 |
| 2009/0069973 A1 | 3/2009 | Li | |
| 2009/0161141 A1 | 6/2009 | Shobu | |
| 2009/0212113 A1 * | 8/2009 | Chiu | G06K 7/1417 235/462.41 |
| 2009/0226044 A1 | 9/2009 | Ngan | |
| 2009/0226047 A1 | 9/2009 | Yu | |
| 2010/0014781 A1 | 1/2010 | Liu | |
| 2010/0066822 A1 | 3/2010 | Steinberg | |
| 2010/0076834 A1 | 3/2010 | Sugaya | |
| 2010/0150434 A1 | 6/2010 | Reed | |
| 2010/0272366 A1 | 10/2010 | Meng | |
| 2012/0018518 A1 * | 1/2012 | Strom | G06T 5/40 235/462.04 |
| 2012/0027297 A1 * | 2/2012 | Feris | G06T 7/11 382/173 |
| 2012/0078989 A1 | 3/2012 | Sharma | |
| 2012/0129574 A1 | 5/2012 | Reed | |
| 2012/0269458 A1 | 10/2012 | Graziosi | |
| 2013/0223673 A1 * | 8/2013 | Davis | G06V 10/464 235/375 |
| 2013/0258047 A1 | 10/2013 | Morimoto | |
| 2014/0029809 A1 | 1/2014 | Rhoads | |
| 2014/0052555 A1 | 2/2014 | MacIntosh | |
| 2014/0112524 A1 * | 4/2014 | Bai | G06T 7/194 382/100 |
| 2014/0222501 A1 | 8/2014 | Hirakawa | |
| 2014/0244896 A1 * | 8/2014 | Goss | G06F 3/0619 711/103 |

(56) References Cited

U.S. PATENT DOCUMENTS

| | | |
|---|---|---|
| 2014/0304122 A1 | 10/2014 | Rhoads |
| 2015/0030201 A1* | 1/2015 | Holub ................ H04N 1/32197 382/100 |
| 2015/0055855 A1 | 2/2015 | Rodriguez |
| 2015/0161427 A1* | 6/2015 | Guo ...................... G06K 7/146 235/462.08 |
| 2015/0213603 A1 | 7/2015 | Li |
| 2015/0278980 A1 | 10/2015 | Sinclair |
| 2016/0063611 A1 | 3/2016 | Davis |
| 2016/0098585 A1* | 4/2016 | Sempere ............. G06K 7/1447 235/462.07 |
| 2016/0105585 A1* | 4/2016 | Holub ................ H04N 1/32149 358/3.28 |
| 2016/0217547 A1 | 7/2016 | Stach |
| 2016/0267620 A1 | 9/2016 | Calhoon |
| 2016/0275639 A1 | 9/2016 | Holub |
| 2016/0364634 A1* | 12/2016 | Davis .................. G07G 1/0063 |
| 2017/0004597 A1 | 1/2017 | Boles |
| 2017/0024840 A1 | 1/2017 | Holub |
| 2017/0206517 A1 | 7/2017 | Kwan |
| 2017/0249491 A1 | 8/2017 | MacIntosh |
| 2018/0005063 A1 | 1/2018 | Chan |
| 2018/0357517 A1 | 12/2018 | Gandenberger |
| 2019/0279328 A1 | 9/2019 | Reed |

FOREIGN PATENT DOCUMENTS

| | | | | |
|---|---|---|---|---|
| JP | 2007134987 A | * | 5/2007 | ........... G06T 1/0064 |
| WO | WO-2004095828 A1 | * | 11/2004 | ......... H04N 1/32144 |
| WO | WO-2009148409 A1 | * | 12/2009 | ........... G06K 7/1093 |
| WO | 165364 | | 8/2019 | |

OTHER PUBLICATIONS

Authentication and Data Hiding Using a Reversible ROI-based Watermarking Scheme for DICOM Images, Osamah M et al., PWASET vol. 38, Feb. 2009 ISSN 2070-3740, pp. 829-834 (Year: 2009).*

New alteration detection technique for printed documents using dot pattern watermarking, Masahiko Suzaki et al., SPIE, Jun. 20, 2003, pp. 665-676 (Year: 2003).*

Poor Quality Watermark Barcodes Image Enhancement, Mohammed A. Atiea et al., Springer, 2012, pp. 913-914 (Year: 2012).*

A Conceptual Design of Genuine Halal Logo Detector, Sharifah Nurul et al., IEEE, 2011, pp. 1-6 (Year: 2011).*

Designing a Color Barcode for Mobile Applications, Keng T. Tan et al., IEEE, 2012, pp. 50-55 (Year: 2012).*

Application of foreground—System, Dariusz Frejlichowski et al., Springer, 10.1007/s 10044-014-0405-7, 2015, pp. 473-484 (Year: 2015).

Jun. 22, 2020 Office Action, and application as filed on Feb. 7, 2019, in U.S. Appl. No. 16/270,500.

U.S. Appl. No. 15/726,290, filed Oct. 5, 2017 (144 pages).
U.S. Appl. No. 15/816,098, filed Nov. 17, 2017 (67 pages).
U.S. Appl. No. 16/011,092, filed Jun. 18, 2018 (221 pages).
U.S. Appl. No. 62/628,223, filed Feb. 8, 2018 (28 pages).
U.S. Appl. No. 62/628,510, filed Feb. 9, 2018 (29 pages).

* cited by examiner

FIG. 4
FIG. 5

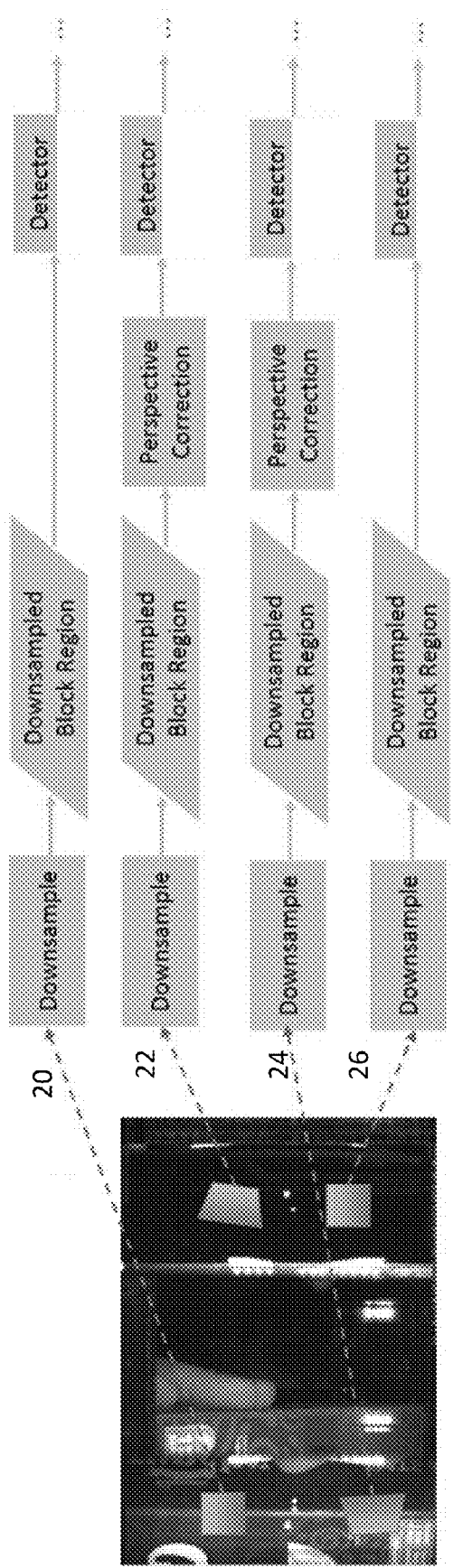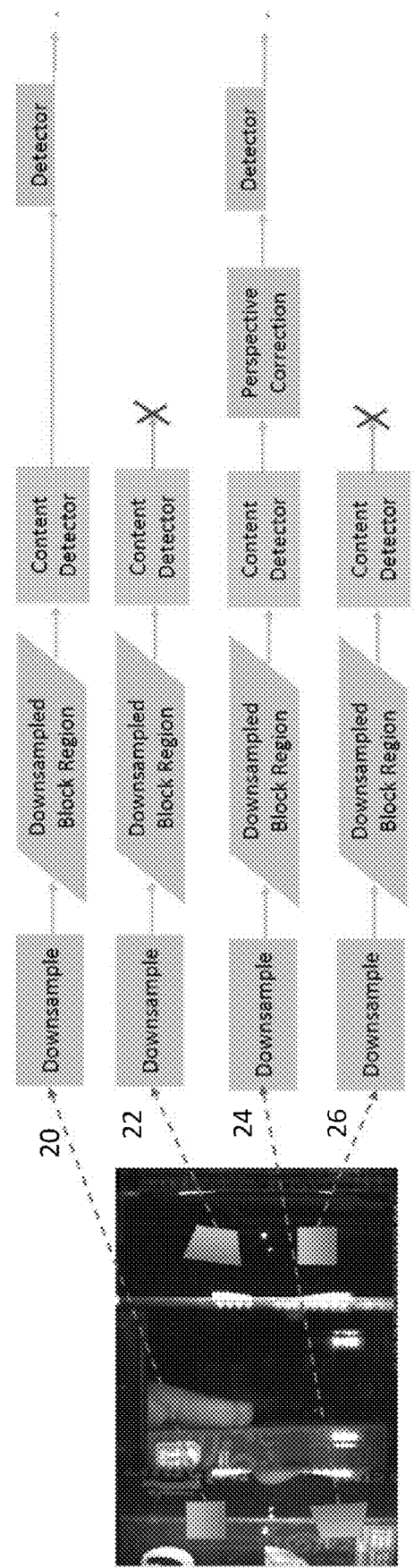
FIG. 7A
FIG. 7B

METHODS AND ARRANGEMENTS FOR LOCALIZING MACHINE-READABLE INDICIA

RELATED APPLICATION DATA

This application claims the benefit of US Provisional Application No. 62/861,961, filed Jun. 14, 2019. This application is a continuation in part of U.S. patent application Ser. No. 16/270,500, filed Feb. 7, 2019 (issued as U.S. Pat. No. 10,958,807), which claims the benefit of US Provisional Patent Application Nos. 62/628,510, filed Feb. 9, 2018, and 62/628,223, filed Feb. 8, 2018. This application is generally related to U.S. patent application Ser. No. 16/435,292, filed Jun. 7, 2019 (published as US 2019-0306385), and U.S. Pat. Nos. 10,593,007, 10,506,128, and 9,922,220. The disclosures of the above patent documents are each incorporated herein by reference in its entirety, including all drawings and any appendices.

BACKGROUND AND SUMMARY

The present technology helps reduce processing time and resource use to discover machine-readable indicia in imagery captured by camera-based systems.

Camera-based systems are widely used to monitor operation of industrial processes and/or facilitate checkout in retail settings (e.g., think grocery and big box stores). One example is in the food industry, where cameras are positioned at different locations along a production line that packages food, or that applies labels to food containers. Another example is a retail checkout station, where items are swiped in front of an often stationary point of sale (POS) scanner.

One of the functions performed by such camera systems is to sense and decode machine-readable markings. In the checkout example, machine-readable markings often carry product identifiers, e.g., GTIN, UPC and/or other codes. This is not a trivial task, given the often limited processing windows and computing resources in such camera systems.

While 1D (and sometimes 2D) barcodes have been used in such checkout and production environments, digital watermarking offers compelling improvements. In a product packaging context, digital watermarking may include a printed marking, e.g., included by modulating design artwork or sparsely peppered against a substrate or background color. The digital watermarking typically conveys a plural-bit data payload. In some, but not as a requirement for all embodiments, the presence of such marking is not generally apparent to an untrained consumer, who inspects a digitally watermarked package from a typical reading distance of 12-24 inches, in normal retail lighting (e.g., 75 to 100 foot-candles), and who has not previously been alerted to the watermarking's existence. Yet, when a camera captures imagery of such a watermarked package, and the imagery is analyzed by corresponding watermark decoding software, the markings can be discerned, and decoded to recover the plural-bit payload. In a retail setting, in addition to product packaging, product labels, hang tags, shelf labels, instructions, wrapping, and receipts can also be digitally watermarked.

Examples of digital watermarking and applications of such can be found, e.g., in assignee's U.S. Pat. Nos. 9,747,656, 9,635,378, 9,449,357, 9,401,001, 9,380,186, 6,614,914, and 6,345,104, which are each hereby incorporated herein by reference in its entirety, and US Published Application No. US 2017-0024840 A1, which is also hereby incorporated herein in its entirety.

One aspect of the present technology involves analyzing reference imagery gathered by a camera system to determine which parts of an image frame offer high probabilities—relative to other image frame parts—of containing decodable watermark data.

Another aspect of the present technology whittles-down such determined image frame parts based on detected content (e.g., cereal box) vs expected background within such determined image frame parts.

Still another aspect is a method for processing a set of image areas within an image frame. The method includes the acts: for each image area, establishing a plurality of subareas, each subarea comprising n×m pixels, where n and m are both integers, each of the pixels including a value; for each subarea: determining an image characteristic representing the n×m pixels; comparing the determined image characteristic to a baseline characteristic associated with the subarea; and classifying the subarea as background or content based on said comparing; and triggering image distortion correction or signal decoding based on a classification from said classifying.

The triggering could be based on a plurality of classifications from said classifying. The image characteristic may comprise a pixel mean value representing the n×m pixels. Or the image characteristic may comprise a pixel greyscale mean value representing the n×m pixels. Yet still, the image characteristic may comprise a brightness or luminance value associated with the n×m pixels.

The method may further comprise maintaining an array or table of baseline values associated with baseline characteristic and maintaining a histogram of pixel values associated with each subarea. The histogram may be updated with the image characteristic. And the updated histogram may be used to update the baseline characteristic.

Yet another aspect of the technology is a method of processing a set of image areas within an image frame, comprising the acts: for each image area within the set of image areas, establishing a plurality of subareas, each subarea comprising n×m pixels, where n and m are both positive integers, each of the n×m pixels including a value; for each subarea: downsampling the imagery within the subarea; determining an image mean value representing the subarea; for each n×m pixel, subtracting the image mean from the pixel value to yield a residue value; comparing the residue value to a representation of image noise to yield a collection of image points; filtering the collection of image points to yield a reduced collection of image points; counting the number of points within the reduced collection of points; and determining whether the subarea should be processed by a signal decoder based on the foregoing.

In some cases, the image mean value comprises a pixel greyscale mean value representing the n×m pixels. And in some case, and prior to the act of subtracting, acts of determining whether the image mean value is above a threshold and stopping processing of the subarea when the image mean value is below the threshold, are carried out.

Another aspect is an image processing method comprising: obtaining image data captured by one or more retail scanner cameras; analyzing a subset of the image data to determine whether it represents a content object or background imagery, said analyzing yielding a determination; and based on the determination, operating a signal localizer to access whether the subset likely includes a 2-dimensional encoded signal carried by a plurality of dots.

Still another aspect is an image processing system including: one or more cameras positioned to capture imagery depicting an object moved past the one or more cameras; one or more light sources positioned to illuminate the object as it is moved past the one or more cameras; means for first determining whether a block of said imagery represents background or the object; and means for second determining whether the block of said imagery likely depicts a dot pattern conveying encoded data, in which said means for second determining operates only when said means for first determining determines that the block of said imagery represent the object.

Another aspect of the present technology includes a method comprising: obtaining image data captured by one or more retail scanner cameras; analyzing a subset of the image data to determine whether it represents a content object or background imagery, said analyzing yielding a determination; and triggering signal decoding or fingerprint extraction based on the determination.

Yet another aspect is a camera-based scanner comprising: one or more cameras; more or more processors configured for: analyzing image data captured by said one or more cameras to determine whether it represents a content object or background imagery, said analyzing yielding a determination; and gating signal decoding or fingerprint extraction based on the determination; and an output for outputting data from a signal decoding or fingerprint extraction.

The foregoing and other aspects, features and advantages of the technology will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 shows an example of three-faceted imagery captured by the tower camera system of the FIG. 1 scanner.

FIG. 5 shows an example of three-faceted imagery captured by the platter camera system of the FIG. 1 scanner.

FIG. 7A shows an image processing flow for the four (4) parts identified in FIG. 6.

FIG. 7B shows the image processing flow of FIG. 7A, improved further with a content detector.

DETAILED DESCRIPTION

Retail checkout benefits from accurately identifying products for purchase. Consumer satisfaction is often enhanced when the identification proceeds in a time-efficient manner. Just think of all the time you've spent standing at a checkout line, wishing it would move faster.

Camera-based systems capture images of moving objects. Consider an item being swiped, e.g., moved past, a stationary camera system. Such systems may include, e.g., CMOS or CCD image sensors, processing circuitry (or one or more processors) and decoding modules. Such decoding modules may configure a processor to detect and decode 1D, 2D or digital watermarking; and/or may be configured as dedicated or special purpose circuitry. An example camera system includes a retail scanner. Example commercially-available retail scanners include, e.g., Datalogic's Magellan 9800i series scanners, Zebra's MP6000 and MP7000 scanners, Honeywell's Stratos 2700 scanner, and NCR's RealScan bi-optic scanners.

Figure 1:
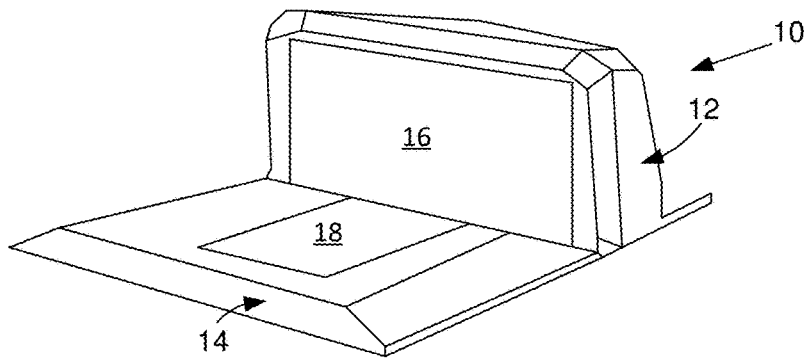
FIG. 1 shows an exemplary camera scanner system.

Referring to FIG. 1, an illustrative retail scanner 10 includes a vertically-extending tower portion 12, and a horizontally-extending platter portion 14. Each portion includes a window 16, 18 through which one or more camera systems captures imagery of items presented for scanning.

Figure 2A:
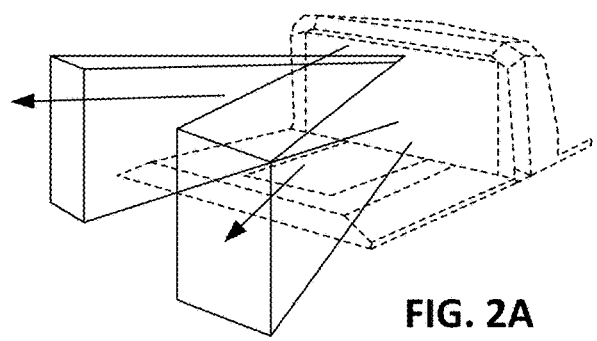
FIGS. 2A, 2B, 3A and 3B show different viewpoints that may be captured by the scanner system of FIG. 1.

In the FIG. 1 scanner, an arrangement of mirrors projects several different views of a retail product onto different parts of a camera sensor in the tower portion. Likewise for the platter portion. In particular, the optics arrangement in the tower captures two views looking out horizontally from the mid-height of the window 16, at angles of roughly+/−45 degrees. These two view axes cross each other over the platter window 18, so as to capture two different views of an object placed on window 18. This is illustrated in FIG. 2A.

Figure 2B:
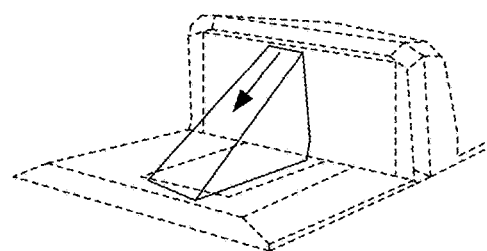

Another mirror arrangement provides a third viewpoint, looking down, at an angle of roughly 45 degrees, from near the top of the tower window 16. This is illustrated in FIG. 2B.

Figure 3A:
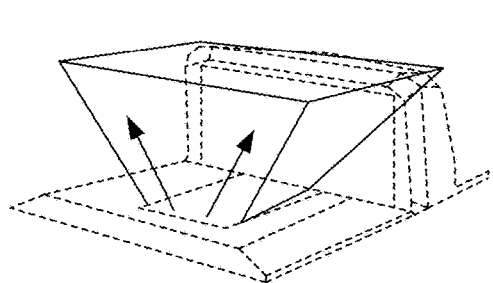
Figure 3B:
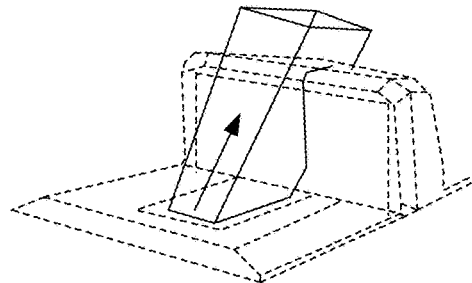

The three views, as projected onto the tower image sensor, are termed "facets." A similar mirror arrangement is employed in the platter portion 14. Two views look up from the window 18 at angles of roughly+/−45 degrees. (Unlike the tower case, these two fields of view don't cross each other.) A third image is also captured by the platter camera sensor, looking up at a roughly 45 degree angle towards the tower. These views are illustrated in FIGS. 3A and 3B.

The projection of three different views onto a common image sensor in the tower portion, and the similar projection of three different views onto a common image sensor in the platter portion, yields composite imagery of the sort shown in FIGS. 4 and 5, respectively. (The center facet of FIG. 4 is void of product imagery because the product (a two liter drink bottle) was positioned a sufficient distance away from the tower window 16 that the downward-looking FIG. 2B view did not capture any of the product in its field of view.)

Camera-based retail scanning systems commonly capture between 30 and 100 frames of imagery every second. If real-time operation is to be achieved, such systems can only allocate a short interval to process each image. For example, if a system captures 60 frames each second, it can devote a maximum of 16.6 milliseconds to each image.

This time constraint is a particular challenge because product-identifying indicia (e.g., a barcode or digital watermark) may appear anywhere in the captured frames. Moreover, each captured image is commonly a synthesis of several different images—captured from different viewpoints by an optical arrangement including multiple mirrors. Searching the full extent of such a composite image in search of a decodable indicia is typically too time consuming. It is generally preferable to examine a limited number of image excerpts.

Once an image has been captured by a retail scanner, a task becomes to locate and read digital watermark indicia depicted somewhere in the image, quickly, before the next-captured image is presented for analysis.

In an exemplary system, the watermark payload is formatted into a binary sequence, which is encoded and mapped to the locations of a tile. For illustration, we describe an implementation of an I by J array of bit cells. The parameters, I and J are integers, and the tile is comprised of an I by I array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher CPI), as the Human Visual System (HVS) is less sensitive to changes at higher spatial frequencies. Examples of bit cell array sizes include 64 by 64, 128 by 128, 256 by 256 and 512 by 512. While each of these is square and has a dimension that is power of 2, the tile need not be so limited. For example, the tile may have another rectangular form. The bit cells correspond to spatial locations within a tile. In particular, the spatial locations correspond to pixel samples at a configurable spatial resolution, such as 75-600 DPI. The payload is repeated in contiguous tiles of artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate the parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take for example a bit cell resolution of 75 CPI. When a tile is encoded into an image with a pixel resolution of 300 DPI, each bit cell may correspond to a 4 by 4 array of pixels in the 300 DPI image. As another example, each bit cell at 150 CPI corresponds to a region of 2 by 2 pixels within a 300 DPI image, or a region of 4 by 4 pixels within a 600 DPI image. Now, considering tile size in terms of I by J bit cells and setting the size of a bit cell, we can express the tile size by multiplying the bit cell dimension by the number of bit cells per horizontal and vertical dimension of the tile. A tile with 128 by 128 bit cells is about 1.7 by 1.7 inches at a CPI of 75 and about 0.85 by 0.85 inches at a CPI of 150. Each provides the same number of embedding locations per tile (16,384), but occupies a different spatial area based on the spatial resolution the two-dimensional array of bit cells. At each of these 16,384 tiny regions, the luminance of the artwork is subtly increased or decreased to thereby encode a plural bit (e.g., 64-bit) payload.

One particular method of encoding a plural-bit watermark payload in imagery of host artwork begins by error-correction coding the payload to yield a large set of raw bits. (Techniques such as block codes, BCH, Reed Solomon, convolutional codes, and turbo codes may be used.) These raw bits are XORed with a pseudo-random noise sequence. Each result is spatially mapped to plural of the 16,384 different regions, and serves to tweak its luminance. The magnitudes of the tweaks may be adjusted, at different locations, in accordance with a model of human visual perception—as applied to the host artwork at the locations where the tweak values will be applied. The tweak values are then summed with the pixel values of the host artwork. Many digital watermarks also convey a calibration signal. This signal (which can comprise a known signal in a transform domain, such as a sparse array of peaks (e.g., 30 to 120 peaks, and preferably 50-70) in the Fourier magnitude domain) enables a watermark detector to discern how an image submitted for decoding has been geometrically transformed since it was originally encoded. For example, the calibration signal (which may be also called an orientation signal or reference signal) allows the detector to discern an amount by which the image has been shifted in X- and Y-directions (translation), an amount by which it has been changed in scale, and an amount by which it has been rotated. With knowledge of such "pose" information (geometric state information), the watermark detector can compensate for, e.g., counter-distort, the geometrical distortion of the image since its original watermarking, and can correctly extract the watermark payload. Example of orientation signals are provided, e.g., in assignee's U.S. Pat. Nos. 9,842,163, 7,986,807, 7,046,819, 6,614,914, 6,625,297, and in US Published Application No. US 2016-0217547 A1, which are each incorporated herein by reference in its entirety.

In an exemplary system, a watermark signal may include a rectangular pattern that is tiled across some or all of the product artwork. The pattern comprises an array of 128×128 "waxels"—defining 16,384 smaller regions where data representing pixel values of the artwork is increased or decreased to thereby encode a plural bit (e.g., 64-1028 bit) payload. While this discussion has generally referred to blocks and patches in terms of pixels, the detailed operations are more typically performed on the basis of "waxels," as was previously noted. A waxel may be the same as a pixel. Or it may be a region of 2×2 pixels, 3×3 pixels, 4×4 pixels, etc.

In an illustrative embodiment, each watermark block is originally encoded and printed on the object artwork (e.g., label or carton) so that each of the 128×128 "waxels" comprising the block is represented by a 4×4 area of pixels, at 300 dpi (i.e., with the printed block spanning 512 pixels, or 1.70 inches, on a side).

In another illustrative embodiment, each waxel corresponds to a 2×2 pixel neighborhood, with a watermark block spanning an area of 256×256 pixels. Within a 1280×960 pixel image frame captured by a camera, which 256×256 block of pixels should be examined, first, for presence of digital watermarking? Which should be examined second, and so on?

A 256×256 block can take an enormous number of possible locations within the image frame. (For example, it can take (1280−256)*(960−256), or 720,896, different locations.) A brute force detection methodology, e.g., attempting to detect and decode watermarking at each possible different location, would require an unruly amount of time and processing resources, e.g., especially for processing-constrained retail checkout scanners.

To deal with this problem, one advantageous technology samples exemplary test images of products scanned by a retail scanner to identify candidate watermark locations that should be examined to decode digital watermarking. Assignee's U.S. Pat. No. 9,922,220, which is hereby incorporated herein by reference in its entirety, details some example detection processes.

Figure 6:
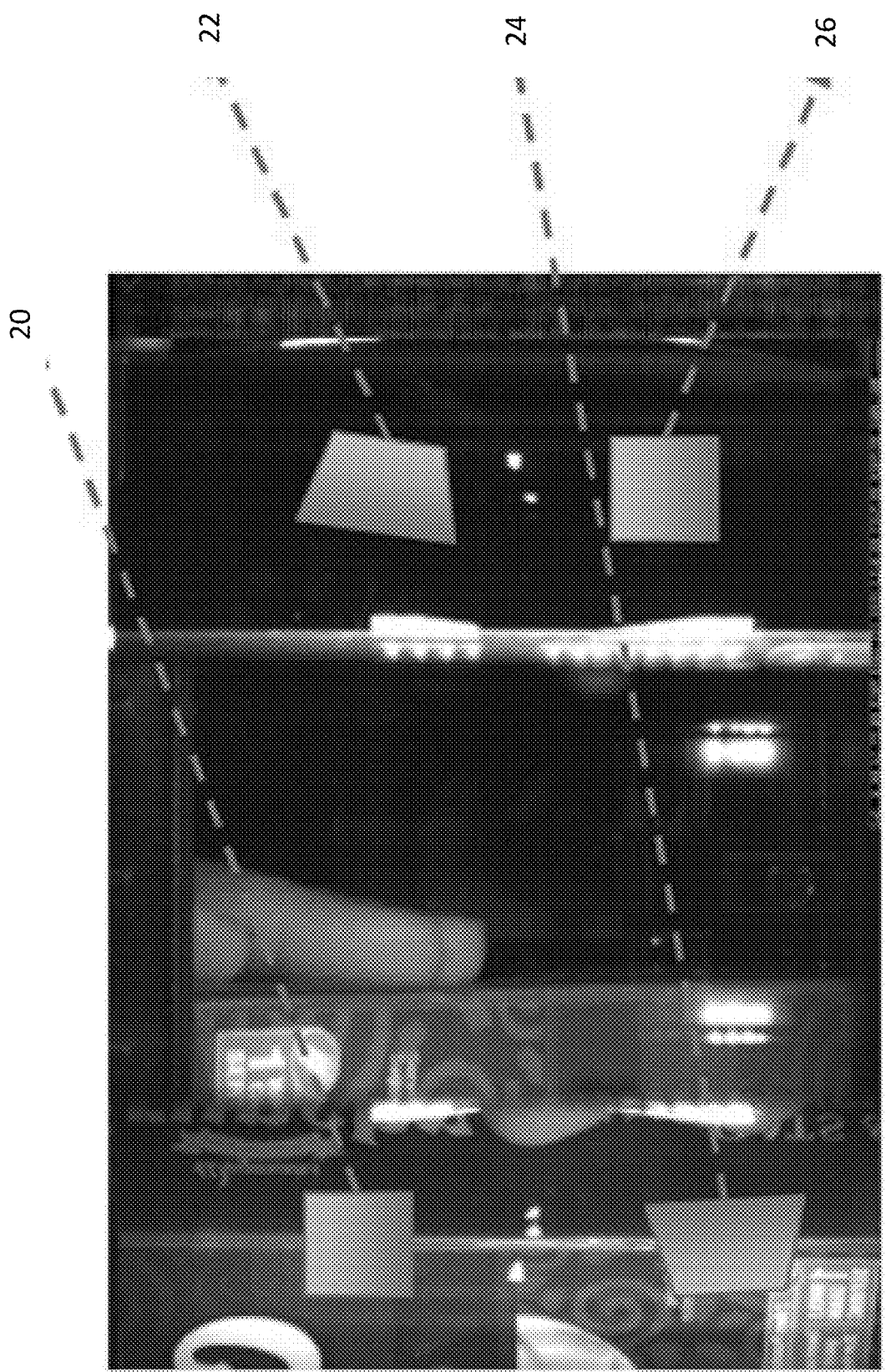
FIG. 6 shows an example of areas of an image frame determined to offer high probabilities of containing decodable watermark data.

In one embodiment of the present technology, a set of watermarked test images is analyzed (e.g., off-line, without the time constraints found in a typical retail checkout scenario) to determine which locations in an image frame captured by a particular retail scanner most commonly have a decodable watermark signal found therein. We'll call these locations "interesting locations" as a catchy, upbeat term. With reference to FIG. 6, areas 20, 22, 24 and 26 represent four (4) such interesting locations. Areas 22 and 24 are shown with trapezoidal shapes as a generic modeling of scanner distortion. For example, some image areas may have distortion (e.g., scaling and/or warping) introduced during image capture due to device characteristics such as lens distortion, focal length, object location, use of mirrors, swipe path, etc. Such distortion can be determined during the above-mentioned off-line analysis of test images. Of course, a particular scanner or other camera may have more or less than four areas identified as likely areas to include watermarking. Interesting areas may include, e.g., 2-26 such areas. However, reducing the number of image areas greatly reduces processing time and processing resources relative to processing most or all portions of an image frame. So, we have settled on 4 such areas for discussion purposes.

An encoded signal detection analysis may proceed according to FIG. 7A, where image data from interesting locations is analyzed to detect encoded signals. The image data can be downsampled, e.g., by a factor of p, where p in an integer, using, e.g., nearest-neighbor downsampling. One example is p comprising 2, 3 or 4; or 8, 16 or 32. Downsampling is helpful since image data can be processed faster with less pixels data to analyze. Other downsampling technology, e.g., bilinear, bicubic, etc. can be alternatively used. Raw image data could be analyzed instead, but with an associated processing time and resources cost that may not be tolerated by a single dad wrestling 2 kids in a grocery store checkout lane. The downsampling yields downsampled image regions corresponding to the interesting locations 20, 22, 24 and 26. In the case of anticipated or known distortion, e.g., corresponding to interesting locations 22 and 24, image distortion correction can be applied to the downsampled image regions. We discussed above how image distortion (e.g., scaling, warping, perspective distortion) can be determined during an offline analysis. With pre-determined distortion information, the image data can be rescaled and transformed (e.g., to remove warp or perspective distortion). The resulting downsampled image regions (perhaps distortion-corrected) are provided to an encoded signal detector, e.g., a digital watermarking detector.

Even further improvements in overall processing time and resource use can be achieved when signal decoding and/or distortion correction is triggered by detection of an object in one or more of the interesting locations. For example, a product swiped past a retail scanner may not yield a depiction of the product in one or more of the four interesting areas. So, there isn't any reason to analyze that vacant area to find a digital watermark. Or there need not be watermark decoding processing from an image frame captured during idol scanner moments, when no products are being scanned. In the FIG. 6 example, an object detected in one or more of the four (4) areas 20, 22, 24 and/or 26 triggers watermark detection in that area(s) where an object was detected.

With reference to FIG. 7B, an object detector (also referred to as a "Content Detector" in the figure) is operated prior to image distortion correction and/or signal decoding. The object detector determines whether the image data corresponding to an interesting location (e.g., 20, 22, 24, 26) includes content or simply contains ordinary background image data. "Ordinary background image data" may represent what the camera sees when an object (e.g., a cereal box) is not viewed. Let's now consider an in-counter point of sale (POS) scanner at a grocery store. The image background for any given image block will generally remain the same over time, until an object (e.g., a cereal box) is swiped in front of the scanner camera(s). The object detector preferably determines image characteristics associated with the background (e.g., static image content relative to an object swipe). These image characteristics can be used to form a baseline characteristic, and an object can be detected within an interesting area when the image characteristics deviate from the baseline characteristic.

Figure 8:
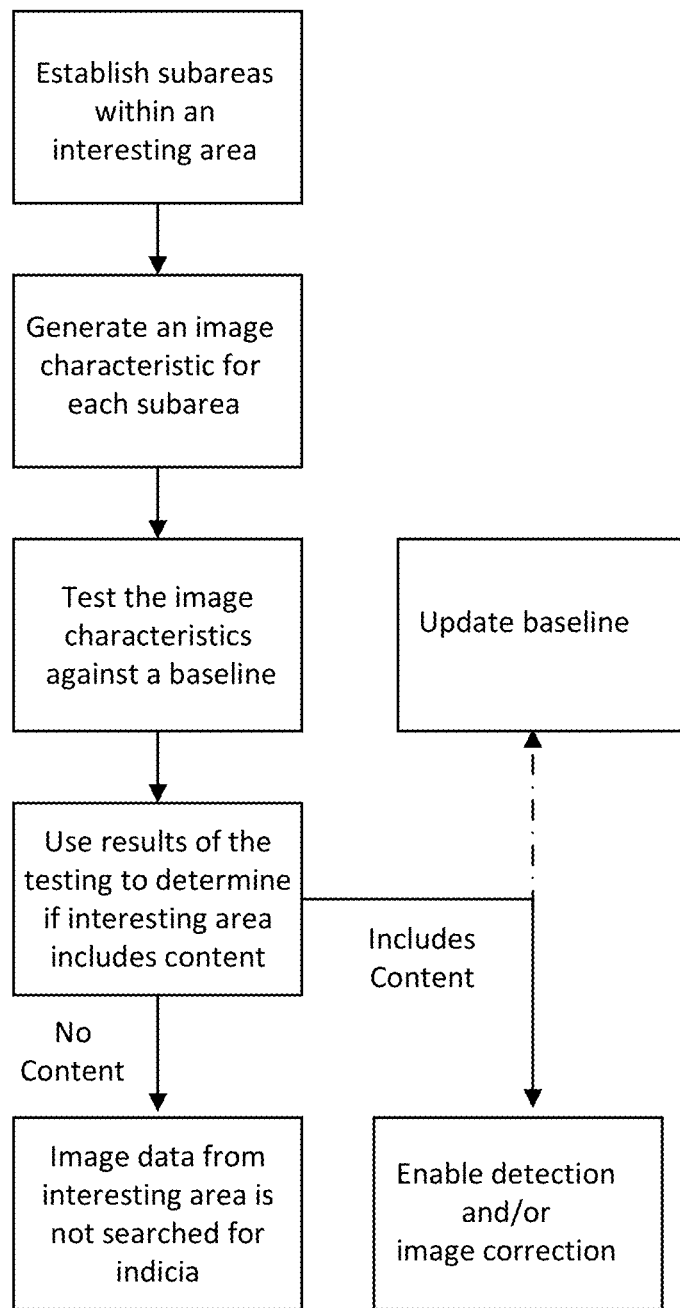
FIG. 8 is a flow diagram for operation of a content detector.

One implementation of an object detector algorithm includes the following with reference to FIG. 8:

1. Divide a region around an interesting area's center into smaller portions. For sure, not all of the image data from an interesting region need be considered. For example, image data corresponding to an interesting location 20, 22, 24 or 26 is designated, segmented or divided into n×m subareas, were n and m are integers. In one example, 4×4 subareas, each 24×24 pixels large, are designated around the interesting area's center. The total pixel area covered in this example is 96×96 pixels, and includes 16 subareas.

2. An image characteristic is determined for each subarea. For example, a pixel value representation (e.g., pixel mean value, mean pixel greyscale value, brightness average, luminance mean value, or a standard deviation or extreme spread of such values) is determined for each subarea. For example, in a 24×24 pixel subarea, a mean pixel value from the 576-pixel set (24×24 pixel subarea) is determined.

3. Test the determined image characteristic against an expected background baseline. For example, the content detector maintains or communicates with an array or table or memory location of background image characteristics (e.g., pixel mean values) for each subarea—we call these a "background keepout" value. The array or table can be built from, e.g., 10 to 10,000 or more test images obtained from the scanner. These can be analyzed offline; or, alternatively, the array or table can be dynamically updated with image data from each captured frame, or from every ith frame, where i is an integer. For example, every $2^{nd}$, $3^{rd}$, $5^{th}$, $7^{th}$, or $10^{th}$ or more frame is used to dynamically update the table or array or memory location. If a subarea image characteristic falls into this background keepout, this subarea will be labeled as background. One example models image content as a Gaussian random variable $N(\mu,\sigma)$. It can be assumed that the variance of pixels are constant and equal. The mean pixel value can be determined by assuming that at each pixel, the most reoccurring value (or value range) during test scans (or dynamically for every ith frame, where i is an integer) includes background image content. A histogram of test data can be generated, with a prominent pixel value in a subarea used as the mean, $\mu_B^i$, for that subarea. A threshold value $\tau$ can be set to distinguish between content (e.g., cereal box)

and background (e.g., idol background) of an observed pixel $x_O^i$ at each location from the background's mean $\mu_B^i$, $$|x_O^i - \mu_B^i| \gtrless \tau$$

4. If less than x out of the y subareas are labeled as background, the content detector has detected some content within an interesting area. For example, if less than 4-8 or less than 4-12 out of the 16 subareas are labeled as background, content is detected within the interesting area. We currently prefer triggering on less than 6 out of 16 subareas.

5. Optionally, a newly determined image characteristic for a tested subarea from function 2, above, can be added into a respective subarea registry, e.g., a histogram.

6. Optionally, the histogram in function 5, above, can be used to re-compute the background keepout values for each subarea after z entries, e.g., where z includes 50-1000 entries, preferably 100-500 entries, and even more preferably, 150-250 entries. This may be helpful in some case, e.g., where an encoded package is left in front of the scanner for some time. In such a case, the background characteristic would then be modeled after the encoded package and not the actual background.

Another optional approach is to disregard image data to build a characteristic if a block reaches a signal decode stage or signal detected stage. In other words, the above algorithms can be modified to stop blocks that have reached a signal read or detect stage from contributing to a learning histogram. Since these cases indicate a strong likelihood that the block includes an encoded signal, its image content can be excluded when formulating a background image characteristic.

As a variant to function nos. 1 and 2, above, we can calculate an image characteristic directly from the raw image data itself. In one example, we select relatively fewer pixels compared all pixels in a subarea. For example, 16 to 64 pixels (e.g., in a 4×4, 4×9, 5×5, 6×6, 7×8, 8×8 pixel pattern around the center of a subarea) from the raw image data are selected, and an image characteristic (e.g., pixel value mean) is computed from these 16 to 64 pixels. This is repeated for each identified subarea. This results in even further reduced processing time and resource savings compared to using all pixels within a subarea to generate an image characteristic. Or, a n×m pixel pattern is selected within an interesting area, e.g., centered around a center of the interesting area, where n and m are integers and n×m yields a smaller pixel number than the total number of pixels in the interesting area, and even more preferably yields a smaller pixel number than 24×24 pixels.

Returning to FIG. 7B, the content detector only triggers or calls a signal detector for interesting areas 20 and 24, since content was not detected in areas 22 and 26. This avoids unneeded distortion correction (path 22) and detection analysis (paths 22 and 26).

Subarea processing order can be varied according to the following. If using a multi-core or multi-thread processor, or multiple processors, processing of paths 20, 22, 24 and 26 (FIG. 7B) can occur in parallel. Otherwise, interesting areas can be ordered randomly for each captured image frame. For example, a random order may be 20, 22, 24 then 26; or 26, 24, 22, then 20; or 22, 20, 26, then 24, etc. The random order preferably changes from one image frame to the next. Further processing can stop for a particular interesting area if no content is found in that area. Or processing may continue on other interesting areas until all interesting areas are processed, or the number of interesting areas reaches a user-specified maximum. For instance, there could be 8-16 interesting areas, but a maximum processing limit is set to 3, so processing of interesting areas stops after finding 3 interesting areas that include content. The detector stage can start processing data from an interesting area as soon as the first one is identified or can be configured to wait until all content-including interesting areas are identified. In this later case, the detector stage can use the same processing order that was used in processing interesting areas, or use a different strategy, e.g., one of the other above strategies.

A related technology applies to creating a faster perceived consumer experience when analyzing image content captured by mobile devices, e.g., iPhones, tablets, Pixel devices, or Galaxy phones, to detect signals encoded therein. Such phones include one or more multi-core processors, touch display screens, and one or more cameras.

When trying to scan or optically capture encoded items (e.g., packages) with mobile devices, we have found that users tend to aim their mobile device at a certain location of interest. For example, the users tend to aim their view screen at a package's company logo, nutrition label, or sometimes prominent text or colors. In some cases, such locations of interest do not include encoded information. Many decoding schemes tend to first analyze image data located at the center of a frame operating under the assumption that encoding is likely to be found in the area that a user is focused on. But if that location is not watermarked for any reason, center-block location will not find an encoded signal.

So, we can add random detection blocks to augment the center detection blocks. For example, consider a package that has a centrally located icon, which is not encoded, but includes encoding elsewhere in the image frame, it takes just a few more frames before a random block is likely placed at an area including encoding. Consider another use case where a user guides their camera to a location of interest from an edge of a package. Randomly placed detection blocks may catch an encoded area before the user reaches the area of interest. Randomly placed detection blocks, in concert with centrally placed detection blocks, provide a perceived faster detection experience to consumers.

A "signal localizer" is another technology that can be used advantageously in combination with the content detector. Whereas the content detector generally operates to identify blocks or image frames including content (e.g., instead of static background), the signal localizer operates to identify blocks likely to contain an encoded signal therein, without preforming a message decode (e.g., without identifying a synchronization or message component). While the examples provided below illustrate locating image areas likely including a so-called sparse mark, the technology can be similarly applied to continuous encoded signals. Assignee's sparse mark technology is described, e.g., in US PCT Application No. PCT/US19/19410, and assignee's published PCT application No. WO 2016/15391, each of which is hereby incorporated reference herein by reference in its entirety. Of course, the signal localizer can be used as a standalone technology and need not be used only in combination with the content detector.

Figure 9A:
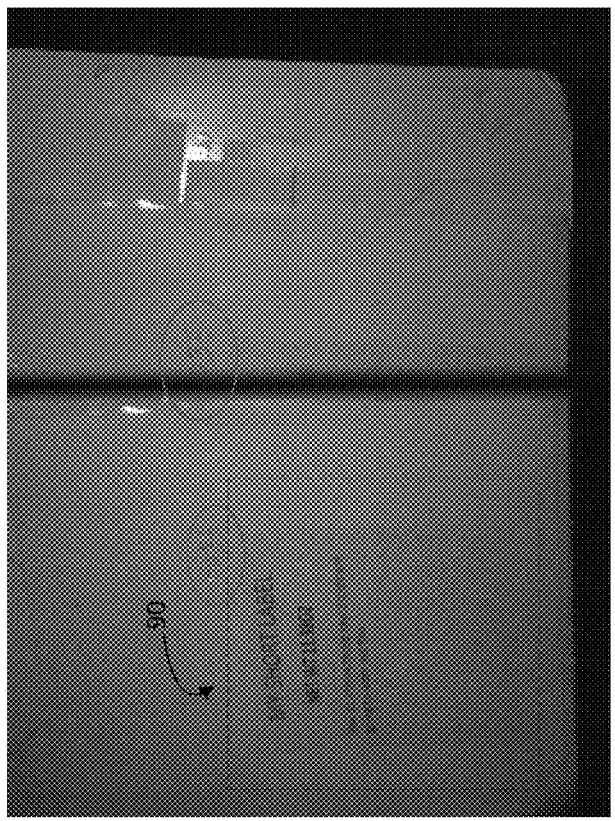
FIG. 9A shows imagery captured by two camera, side-by-side. The imagery includes an encoded label.

In a first embodiment of a signal localizer, image data is obtained, e.g., corresponding to a point of scale scanner or mobile device. For example, FIG. 9A shows imagery captured by a multi-camera point of sale scanner having two camera views displayed side-by-side. The imagery's left side shows a sparse mark encoded label ("MY SHORT LABEL") within area 90. Due to different camera angles, the imagery's right side shows only the right most edge of the example label (e.g., compare the "D35" shown in the left and right views).

The obtained imagery is down-sampled (e.g., by a factor of 1.25-4, preferably 1.5), if necessary, so it is at scale=1 with respect to an expected scale of signal detector. That is, each waxel is depicted with the size of one pixel. We are looking for dark pixels in a field of light—pixel outliers. However, the image contrast may be large or small, and the illumination may vary across the block. The computed metric desirably should be robust to such variables. To do this, we compute a measure that examines neighborhoods of pixels, and also takes into account sensor acquisition noise.

Figure 9B:
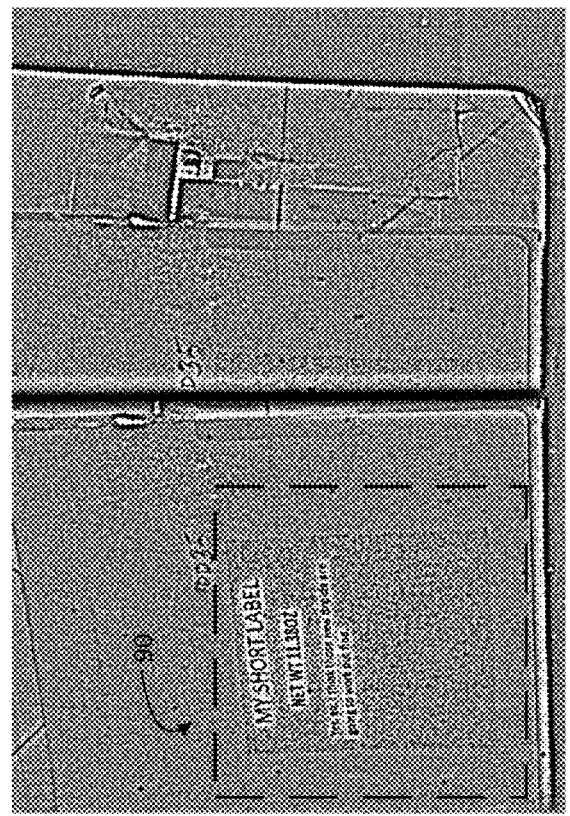
FIGS. 9B-9F show various processing and/or evaluation of the FIG. 9A imagery.

The acquisition noise present in captured imagery is a function of pixel values, with higher pixel values having higher noise values. A polynomial function, or a reference table, can provide a noise standard deviation value for each pixel value between 0 and 255. To identify pixels with outlier values (e.g., pixels that are relatively darkest in a field of relatively lighter pixels), a measure, sigma, is computed for a neighborhood of pixels around a subject pixel at coordinates (i,j) and having a value x, by the equation:

$$\sigma_{(i,j)} = \frac{x_{(i,j)} - \overline{N_{(i,j)}}}{S(\overline{N_{(i,j)}})}$$

where the N-bar term is the average pixel value over the neighborhood, and the S term is the standard deviation of acquisition noise for the neighborhood, based on the polynomial or the reference table data. (The best neighborhood size can be heuristically determined. Neighborhoods can be as small as 4×4, or as large as 64×64, for a 128×128 block size. An 5×8 or 8×8 neighborhood are exemplary. Alternatively, the neighborhood can be temporal, comprising the value of a single pixel at coordinates (i,j) throughout a series of previously-captured frames, e.g., dozens or hundreds.) A visualization of the FIG. 9A's sigma values are shown in FIG. 9B.

Figure 9C:
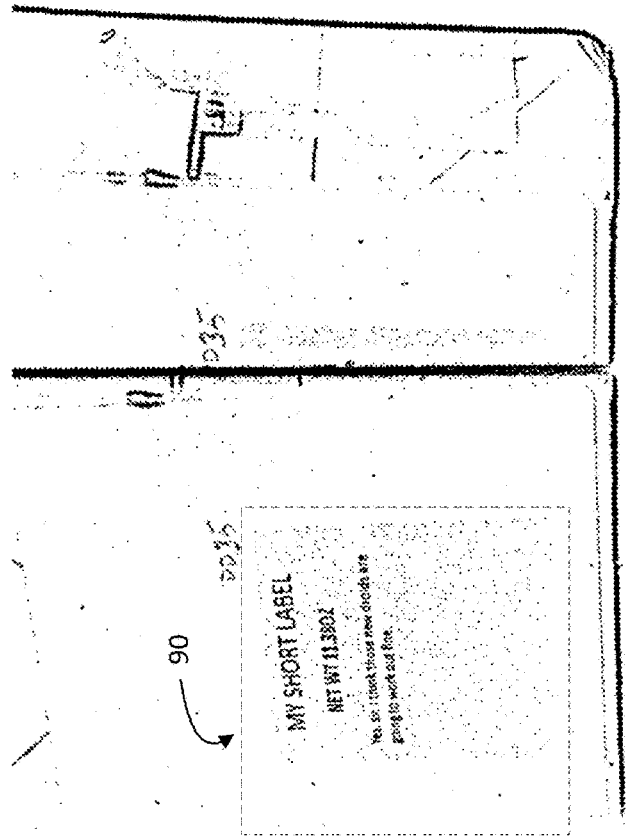

For pixels darker than the neighborhood average, this sigma value will be negative. To be regarded as a sparse mark dot, we set a darkness threshold that the sigma value must meet, e.g., $\sigma_{ij} < -3$. Of course, the threshold may be less than or equal to 2.25-6. We produce a filtered image block that includes only those pixels for which the corresponding sigma value meets this test. Such results for FIGS. 9A and 9B are shown in FIG. 9C. All other pixels are removed (e.g., set to white, with pixel value=255).

Figure 9D:
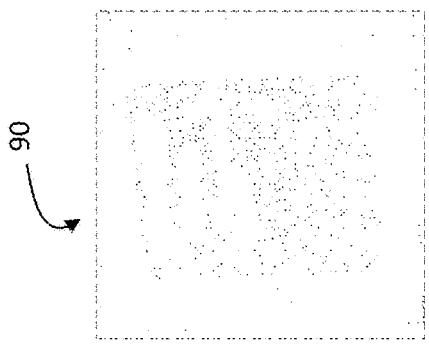

The procedure so far identifies the darkest dots, but in so doing also includes pixels forming the darkest edges (e.g., including dark text). To focus our signal extraction efforts on sparse mark dots, we want to filter out pixels that are not separated from other pixels (e.g., using morphological filtering). Various techniques can be used for this task. A simple technique is to visit every dark pixel, examine a 5×5 pixel region centered on that image location, and count the number of dark pixels in the region. If there are more than two dark pixels in the 5×5 region, the center pixel is removed (e.g., changed to white). The resulting processed block is then comprised wholly of isolated dark dots. FIG. 9D shows a filtered version of FIG. 9C.

Figure 9E:
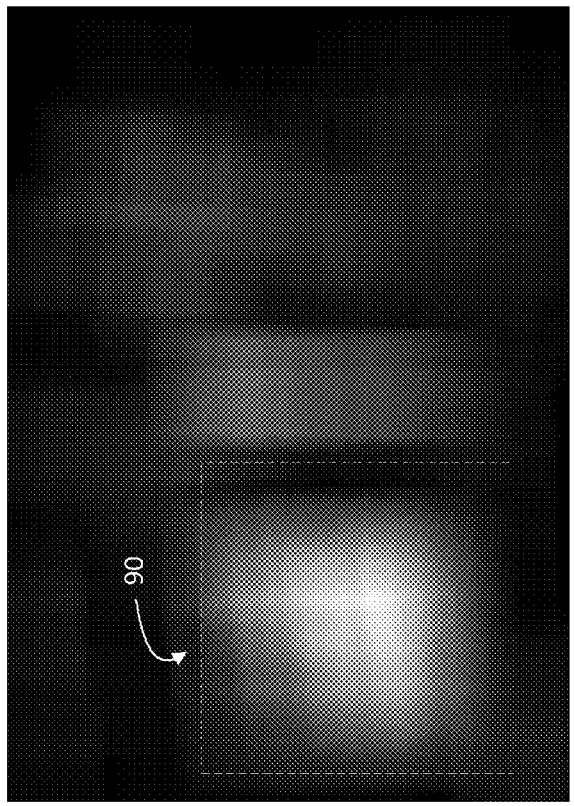
Figure 9F:
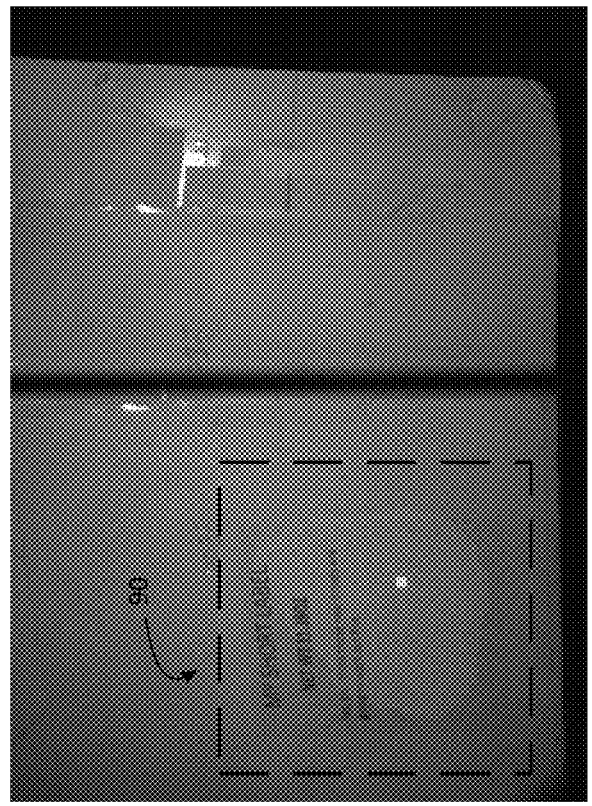

This processed block can be examined to count the number of dark dots remaining, within the block boundary. This count serves as a metric indicating a likelihood that the block contains a sparse watermark. This metric may be compared to see if it exceeds an empirically-determined threshold K (e.g., K=500) to identify frames likely to depict sparse watermark data. Alternatively, blocks within the frame can be ranked based on their associated sparse metrics, and those blocks having the highest sparse metrics can then be further analyzed for sparse watermark data, up to the block-processing budget limit. FIG. 9E shows a heatmap with light areas representing higher dot density. FIG. 9F shows another heatmap where a block having the maximum number of dots is highlighted relative to an area of relatively dense dots.

Various simplifications and modifications can be made to this particular algorithm. For example, a simpler procedure just identifies a set of darkest pixels in the block. (For example, the darkest 10% or 30% of pixels in the block can be identified.) The procedure then applies the above-described morphological filtering and counting operations to yield a sparse metric. Another variant arrangement discriminates potential sparse dots from not, by learning gleaned from previous image frames.

An exemplary learning process analyzes pixel values from a sampling of, e.g., 10 blocks in each frame, for a series of past frames. Each block is divided into sub-blocks, e.g., of 5×8 pixels. For each analyzed sub-block, both the mean pixel value and the minimum pixel value are determined. In some sub-blocks, the minimum pixel value will be that of a dark sparse dot. Other sub-blocks don't include a sparse dot, so the minimum pixel value will simply be the lowest-valued pixel among image content that is not a sparse dot (e.g., background imagery, an item marked with a continuous-tone watermark instead of a sparse watermark, etc.).

From these collected statistics, we identify the largest of the minimum pixel values (the "max-minimum"), for each associated sub-block mean value. For example, if we consider all sub-blocks that have a mean pixel value of 151, we may find that the largest of the minimum pixel values encountered in the analyzed series of frames is 145. Any pixel value larger than 145 is pretty-assuredly not a sparse mark dot, in a sub-block having a mean value of 151. This value, and other values similarly observed, can thus help establish a threshold to discriminate potential sparse mark dots (outliers) from not-potential sparse dots.

In one particular embodiment, we describe the set of all such points by a best-fit line, characterized by a slope and offset, e.g.:

$$\tau_{Outlier} = 0.96 * \mu - 1.6$$

where μ is the mean pixel value for a sub-block.

In another particular embodiment, a best-fit line is characterized by:

$$\tau = \mu - \frac{3 * \sigma}{1.5}$$

where μ is the mean pixel value for a sub-block, σ corresponds to pixel value standard deviation and 1.5 corresponds to a downsampling value. Of course, we may select a different scaler for sigma in the range of 2.25-6; and may select a different value for the downsampling if a different factor was used.

Thereafter, when a new frame of imagery is received, we compute the mean value of each 5×8 or 8×8 or 16×16 pixel sub-block and determine the applicable outlier threshold by the best-fit line equation. Any pixels in the sub-block having values smaller than this threshold are identified as candidate sparse dots. (E.g., if a sub-block has a mean pixel value of 82, we treat all pixels in that sub-block with pixel values of 77 and less as candidate sparse dots.) We then apply the morphological filter across the block to discard connected dots, as described earlier, and then count the number of dots remaining in the block, yielding the sparse metric. As before, this metric can be tested against a threshold to identify blocks that merit watermark processing. Alternatively, all blocks in the frame can be ranked according to this metric and be selected for processing on that basis—until the block-processing budget is reached.

In alternative embodiments, the above-detailed processes can be altered to generate a metric based on bright pixels in a dark field (i.e., salt-in-pepper). One such alteration simply inverts the image block, dark-for-light, before performing one of the just-described algorithms.

Figure 10:
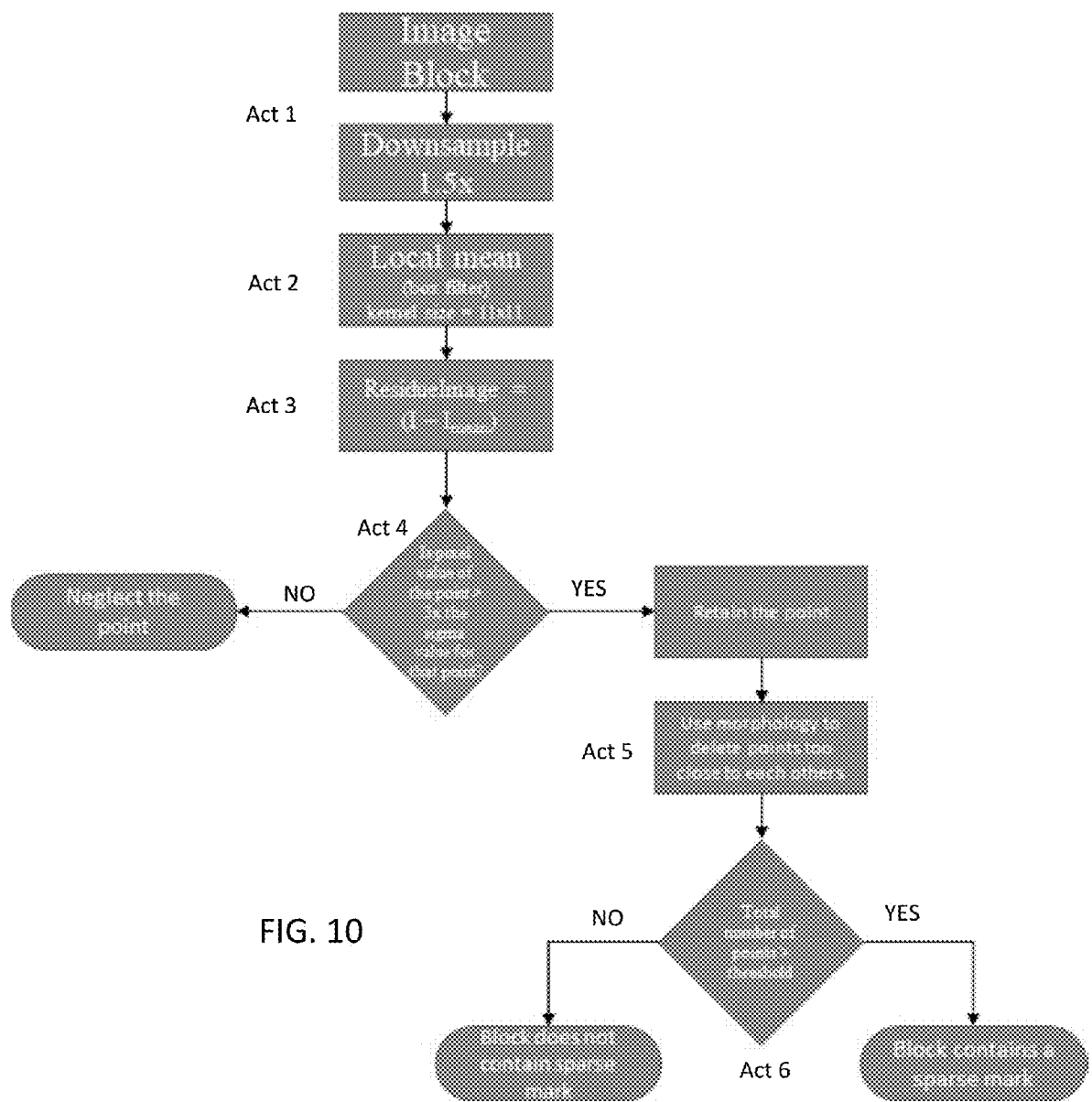
FIG. 10 is a flow diagram showing one embodiment of a signal localizer.

A second embodiment of a signal localizer is now described with respect to FIG. 10. A first act (Act 1) includes obtaining image data and then downsampling to a signal detector resolution, e.g., downsampling between 1.25-4 depending on a target resolution. FIG. 10 illustrates a 1.5× downsampling factor. Downsampling reduces image acquisition noise and helps fortify a sparse mark dot pattern to be invariant to devices and resolutions. This act can be avoided if downsampling has already occurred upstream.

Figure 12A:
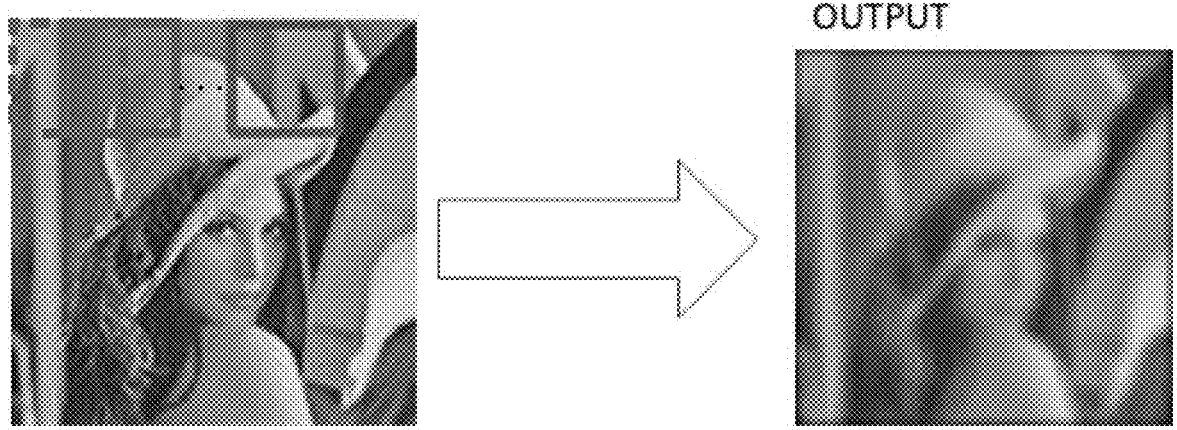
FIGS. 12A and 12B illustrate various ways to calculate pixel mean values.
Figure 12B:
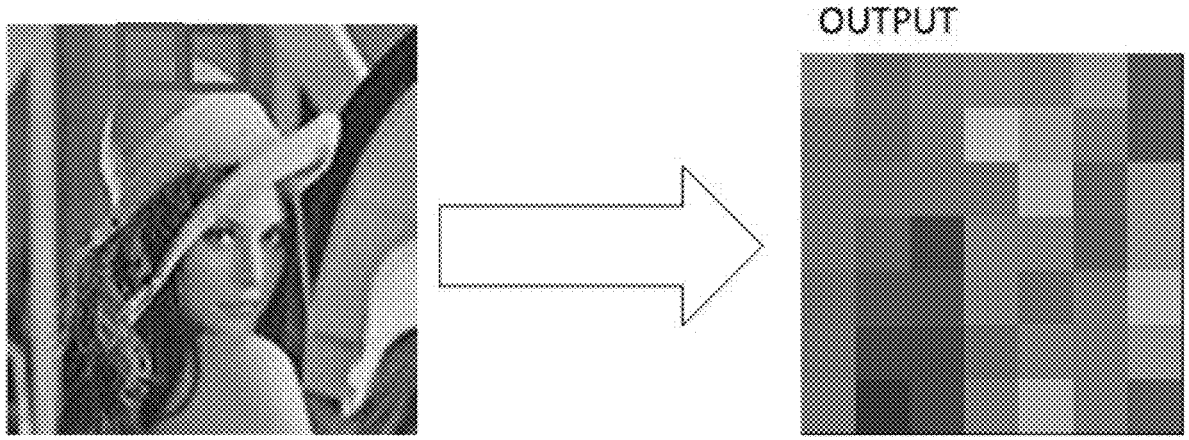
Figure 13:
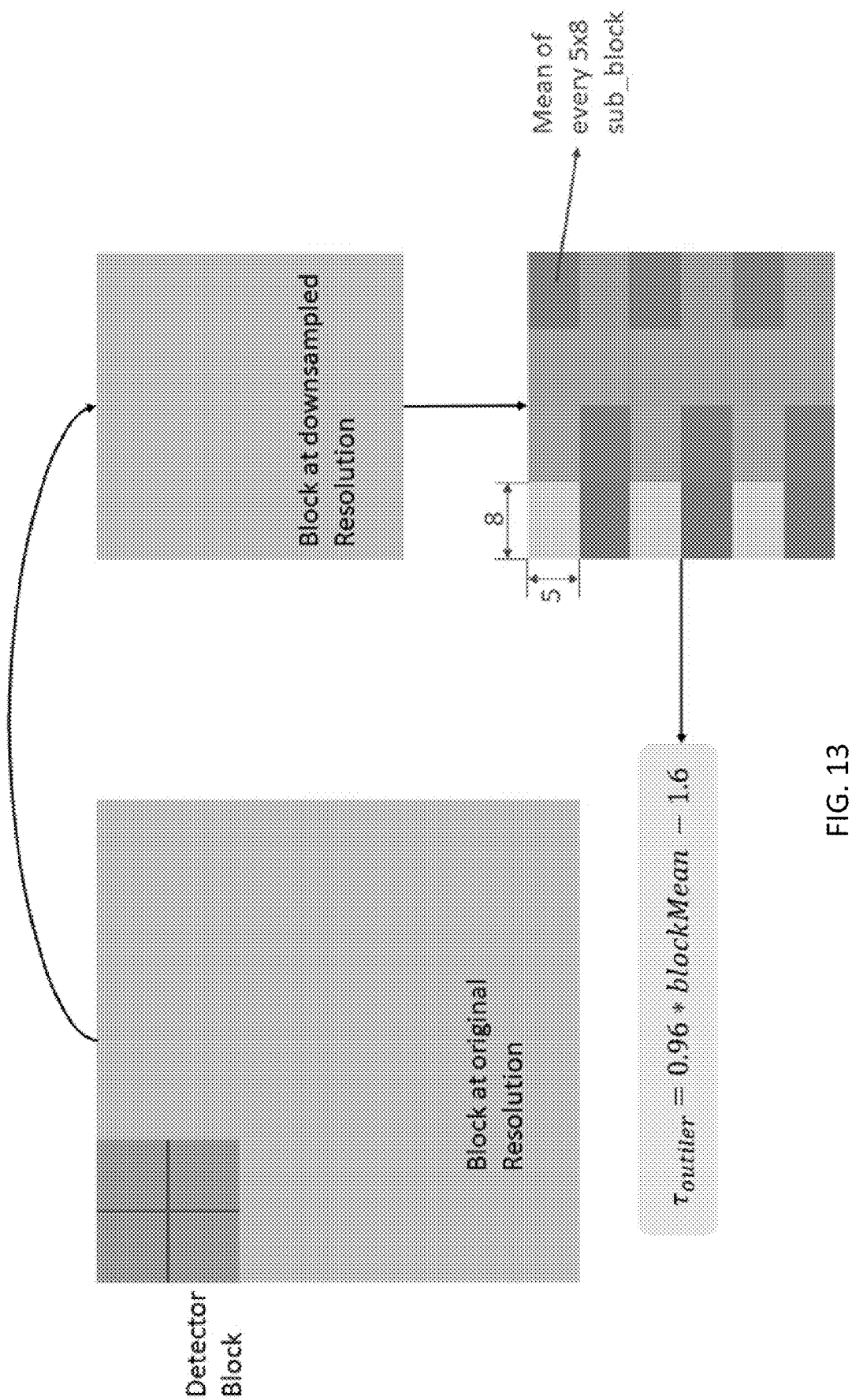
FIG. 13 is a block diagram showing steps to calculate a best fit curve associated with a signal localizer.

A local mean is calculated in Act 2. In a first implementation, a mean value for a central pixel is calculated from a corresponding window comprising n×m pixels. That is, the value for the central pixel represents the mean value of all n×m pixels within such window. The window slides across and down an image so a mean value per pixel can be determined. FIG. 12A illustrates an output image using this procedure. In a second implementation, a mean value is determined for all pixel within a non-overlapping window. For example, if the window is 8×8 pixels, a mean pixel value is determined for the window, and all pixels within the window acquire the mean pixel value. The window moves across and down the image in a non-overlapping manner. So, a resulting mean output will be different blocks, with pixels within a block having the same value. FIG. 12B illustrates this second implementation. FIG. 13 illustrates a particular example where image mean values are determined by this second implementation.

Figure 11:
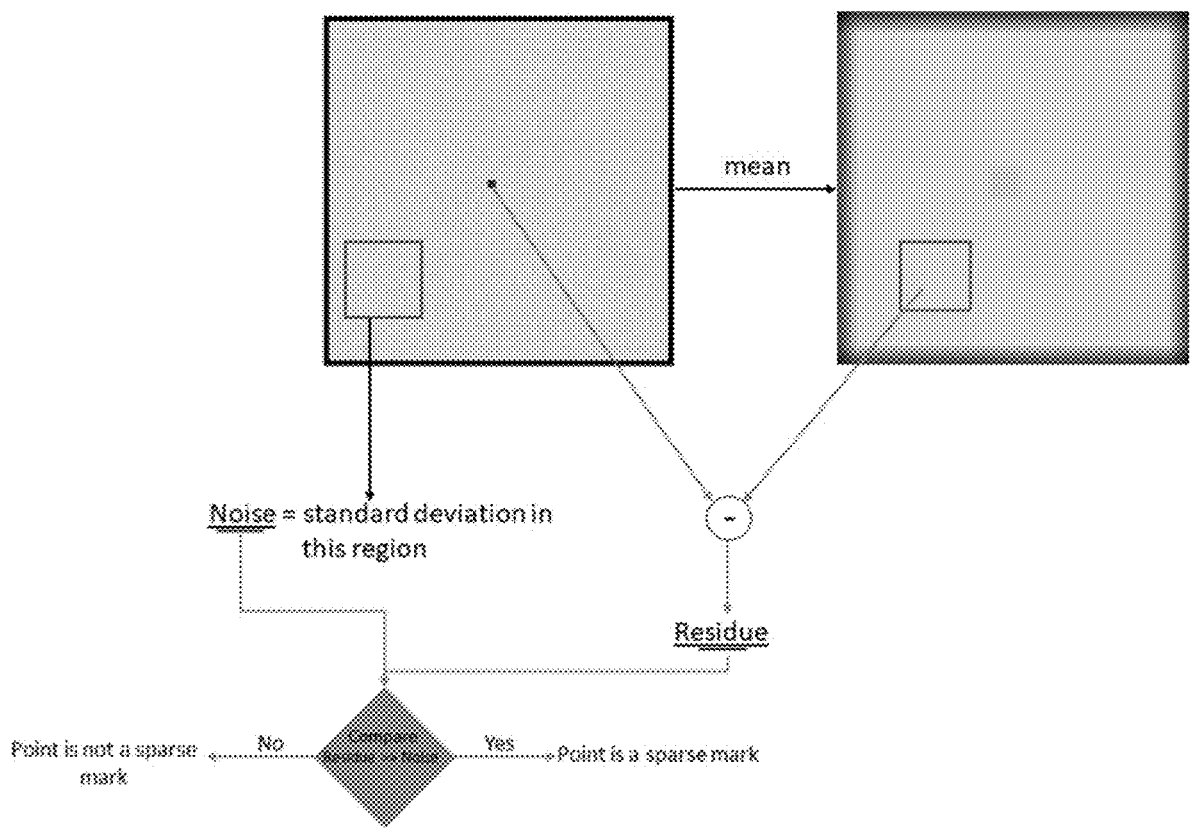
FIG. 11 graphically illustrates an implementation of Acts 3 & 4 from FIG. 10.

An image residue value is determined in Act 3. In one implementation, a mean pixel value determined in Act 2 is combined (e.g., subtracted) with its corresponding pixel value. The result is the residue image value. This value is then compared relative to noise, e.g., due to hardware and camera characteristics, within the imagery. See Act 4. For example, the residue image value can be compared against 2.5-6 sigma (e.g., represented by standard deviation of pixel values in a region). FIG. 11 graphically illustrates Acts 3 and 4.

Points (or dots) passing Act 4's filter are retained and processed to minimize the influence of text, lines and dot clusters. For example, retained points are processed to erode the points, e.g., using image morphology. See Act 5. Remaining points within subblocks are counted to determine whether the total number exceeds a threshold. See Act 6. Subblocks above the threshold may be evaluated by a signal detector to determine whether the remaining dots correspond to an encoded signal.

Figure 14:
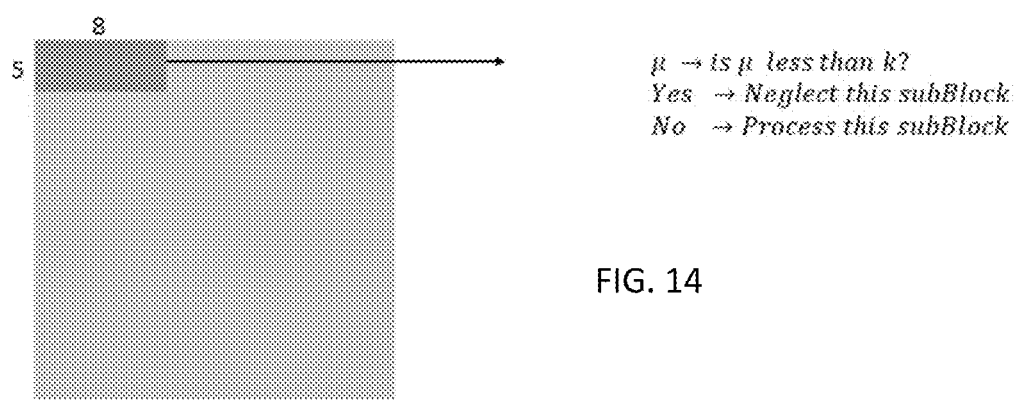
FIG. 14 shows a subblock analysis based on a threshold.

One variation of the above signal localizer embodiments is to filter subblocks following pixel mean calculation. For example, dark subblocks can be identified and excluded since such dark blocks rarely represent packages, labels or other printed or engraved objects. Similarly, over-saturated blocks can be identified and excluded since encoded signals are difficult to decode from over-saturated areas. With reference to FIG. 14, a mean value $\mu$ for a subblock is evaluated relative to a reference value k. The subblock is discarded (e.g., not processed by Acts 3-6 in FIG. 10) if $\mu$ is less than k. Otherwise the subblock is processed. On an 8-bit integer pixel value scale where black=0, and white=255, a threshold k in a value range of 10-50 can be used. In an alternative, a threshold in the range of 15-30 can be used, with a current preference for a pixel value threshold equal to or less than 25. While not pictured in FIG. 14, the mean $\mu$ can also be compared to see if it exceeds a value indicating saturation. For example, a value in the range of 220-255 can be selected as a saturation threshold.

Figure 15:
FIG. 15 shows the FIG. 9A imagery, including ten interesting areas.
Figure 16:
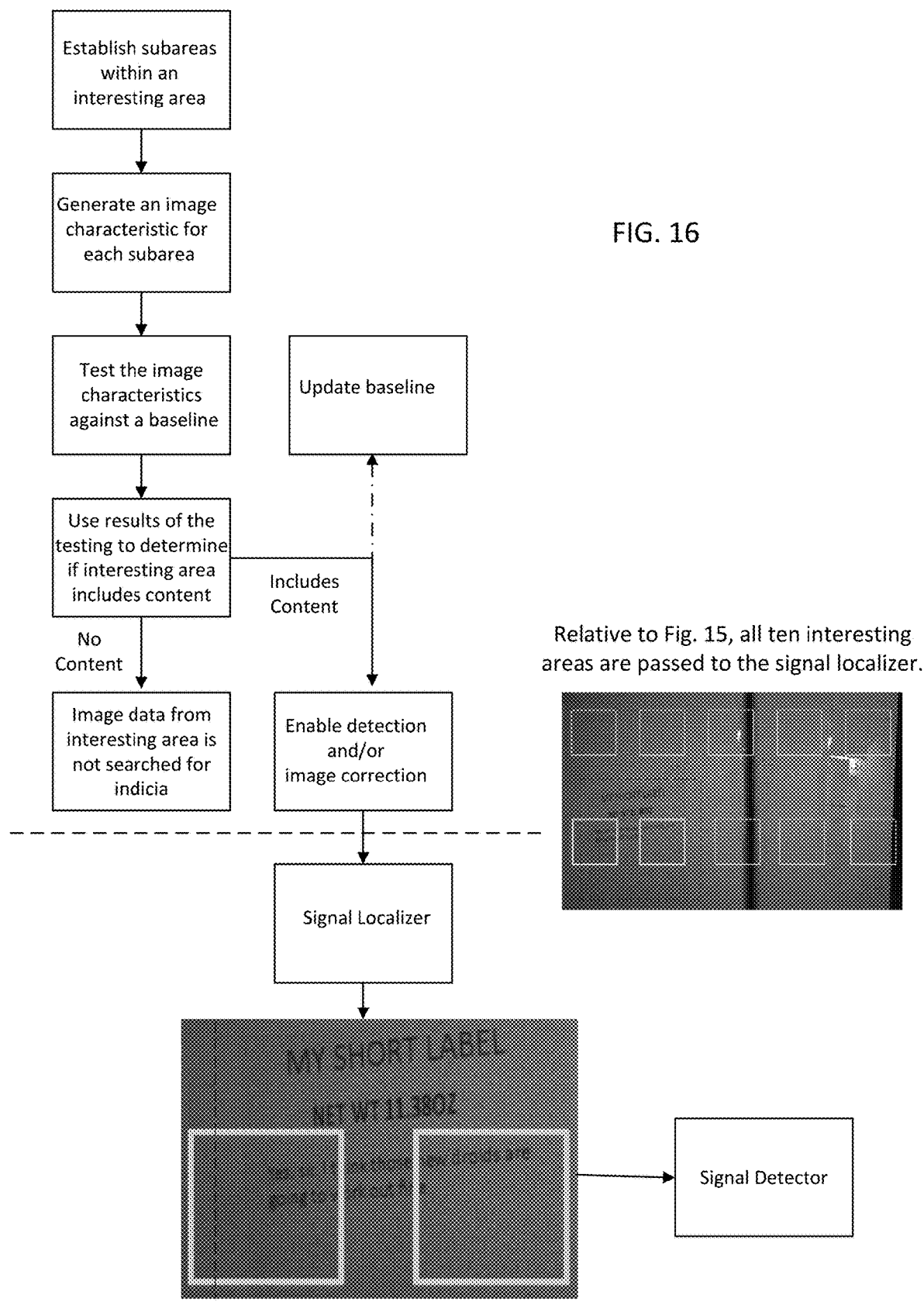
FIG. 16 is a block diagram showing cooperation between a content detector and a signal localizer.

With reference to FIGS. 15 and 16, the FIG. 9A label is used as an example showing possible cooperation relative to both the content detector and the signal localizer. Ten detection blocks (or in keeping with the FIGS. 7A-7B terminology, "interesting areas") are represented with light boxes in FIG. 15. These ten interesting areas represent image location expected (e.g., offline through sampling data) to likely yield detectable signals from one image capture to another when scanning encoded items. With reference FIG. 16, all ten areas run through the content detector technology to determine whether they contain content or simply unchanging background. In the FIG. 15 example, all ten areas pass this test. (We note that the Label shown in FIG. 15 is affixed to a white sheet, which would trigger as content if swiped in front of a point of sale camera or other reading system). Yet, only the bottom 2 leftmost areas (shown with heavily box lines) represent imagery including encoded information. So, the chances of reading the signal from the interesting areas would be 2/10. The signal localizer can be employed to efficiently whittle down the ten blocks to find those with an encoded signal. All ten interesting areas are passed onto the signal localizer. The signal localizer operates to identify which of the 10 blocks (or any image data passed to it) include an encoded signal. The output of the signal localizer identifies blocks likely to include an encoded signal, e.g., a sparse mark signal. For example, in FIG. 16, the localizer would identify the bottom, left most 2 blocks from FIG. 15 and enable detection on imagery within only those two. In one example, the detection technology described in Assignee's U.S. Pat. No. 10,242,434, which is hereby incorporated herein by reference, is utilized to facilitate signal detection.

A serial process employing both a content detector and a signal localizer offers a great processing efficiency relative to processing all image areas, and even those image areas identified as including content. For example, a full signal decode may require a frequency domain transformation. Limiting image areas to transform greatly reduces overall processing time to detect a signal within imagery.

Operational Environments

Having described and illustrated principles of the technology with reference to certain embodiments, it should be recognized that the technology is not so-limited.

For example, while the foregoing description has focused on digital watermark detection, the artisan will recognize that the detailed arrangements can also be used advantageously in extracting information from imagery by other techniques, such as by optical character recognition (OCR), barcode decoding, image fingerprint recognition (e.g., by SIFT, bag-of-features techniques, etc.), and recognition by neural networks (e.g., convolutional neural networks, as detailed in Applicant's pending patent application Ser. No. 15/726,290, filed Oct. 5, 2017, which is hereby incorporated herein by reference in its entirety). For example, our content detector technology (FIGS. 7B and 8) can be used prior to image fingerprint extraction.

Naturally, the particular numeric values detailed above are exemplary, and should not be taken as limiting the scope of the technology. An interesting area or subarea may be any size. A watermark block needn't be 128×128 pixels. A waxel needn't be a 2×2 pixel region. Etc., etc.

Although some of the above examples employed a single watermark detector, e.g., to successively examine multiple interesting areas, it should be recognized that multiple watermark detectors can run simultaneously, e.g., on different cores of a multi-core processor. Thus, for example, interesting area 20 may be submitted for decoding on Core2, while interesting area 26 is being watermark-decoded by Core1.

While the emphasis of the foregoing description has been on implementations in retail checkout, it will be recognized that the principles of this technology finds utility in various different contexts, including industrial applications (e.g., warehouse management and e-commerce fulfillment) and consumer (e.g., in connection with smartphones).

Computing devices suitable to perform the processes detailed herein are familiar to the artisan. In general terms, each may include one or more processors, one or more memories (e.g. RAM), storage (e.g., a disk or flash memory), a user interface (which may include, e.g., a keypad, a TFT LCD or OLED display screen, touch or other gesture sensors, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The arrangements detailed above can be implemented using a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular type of hardware structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed arrangements, e.g., the systems, methods and algorithms discussed relative to FIG. 7B, FIG. 8, FIG. 10, and/or FIG. 16, on a microprocessor involves first defining a sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

As noted, many microprocessors are now amalgamations of several other microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to compute a Shannon entropy metric, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed technology, e.g., the systems, methods and algorithms discussed relative to FIG. 7B, FIG. 8, FIG. 10, and/or FIG. 16 again begins by defining a sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed systems, methods and algorithms discussed relative to FIG. 7B, FIG. 8, FIG. 10, and/or FIG. 16, is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, a watermark calibration signal can be defined by parameters stored in a re-writable memory. By such arrangement, the same ASIC may be incorporated into two disparate devices, which employ different watermark calibration signals. One may be a system for reading watermark-encoded identifiers from objects on a checkout conveyor belt or clerk assisted swipe, which looks for a calibration signal comprised of one particular constellation of spatial frequency signals. A second may be an age verification terminal (e.g., at a liquor store) for reading watermark-encoded birthdate information hidden in a driver's license—which looks for a calibration signal comprised of a second, different constellation of spatial frequency signals. The chips are all identically produced in a single semiconductor fab, but are differentiated in their end-use by different calibration signal data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASIP may be designed to include native instructions that serve operations prevalent in a particular application (e.g., pixel greyscale mean value). However, such native instruction set would typically lack certain of the instructions available in more general purpose microprocessors.

Reconfigurable hardware and ASIP arrangements are further detailed in patent published patent application 20170004597, the disclosure of which is incorporated herein by reference in its entirety.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a computer in a food packaging facility) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

In addition to the patent documents referenced elsewhere, details concerning watermarking are known from Applicant's U.S. Pat. Nos. 6,122,403, 6,345,104, 6,424,725, 6,516,079, 6,590,996, 6,912,295, 6,988,202, 7,013,021, 7,076,082, 7,231,061, 7,978,875, 7,574,014, 7,013,021, 6,442,284, 20100150434, 20120078989, 20120129574, 20140052555, 20140304122, 20150278980, 20160063611, and 20160275639.

Linking from watermarks (or other identifiers) to corresponding online payoffs is detailed, e.g., in Digimarc's U.S. Pat. Nos. 6,947,571 and 7,206,820.

Arrangements for identifying regions within captured imagery that have higher probabilities of watermark detection are detailed in Applicant's U.S. Pat. Nos. 6,442,284, 6,516,079, 7,013,021 and 20150030201 (as well as in certain of the earlier-referenced documents). Another arrangement for setting camera exposure to capture imagery of watermarked objects is taught in U.S. Pat. No. 6,366,680. Publication 20160267620 teaches how watermarking can be used to ensure that components of multi-component packaging are assembled correctly.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein in its entirety including any appendices and all drawings. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, Applicant claims as the invention all such modifications as may come within the scope and spirit of the following claims and equivalents thereof.

What is claimed is:

1. A method of processing a set of image areas within an image frame, comprising the acts:
    for each image area within the set of image areas, establishing a plurality of subareas, each of the plurality of subareas comprising nxm pixels, where n and m are both positive integers, each of the nxm pixels including a pixel value;
    for each of the plurality of subareas, and using one or more multi-core processors:
    downsampling imagery within the subarea;
    determining an image mean value representing the subarea;
    for each nxm pixel, subtracting the image mean value from the pixel value to yield a residue value;
    comparing the residue value to a representation of image noise to yield a collection of image points;
    filtering the collection of image points to yield a reduced collection of image points;
    counting a number of points within the reduced collection of image points; and
    determining whether the subarea should be processed by a signal decoder based on the foregoing.

2. The method of claim 1 in which the image mean value comprises a pixel greyscale mean value representing the nxm pixels.

3. The method of claim 2, in which prior to said act of subtracting, determining whether the image mean value is above a threshold; and stopping processing of the subarea when the image mean value is below the threshold.

4. An image processing system including:
    one or more cameras positioned to capture imagery depicting a physical object moved past the one or more cameras, the one or more cameras comprising a field of view, in which the physical object comprises a 2-dimensional dot pattern conveying encoded data, and in which the field of view includes static image background which is occasionally interrupted by the physical object when moved past the one or more cameras;
    one or more light sources positioned to illuminate the physical object as it is moved past the one or more cameras;
    means for first determining whether a block of captured imagery represents a state between two states, the two states consisting of: i) the static image background, and ii) the physical object; and
    means for second determining whether the block of captured imagery likely depicts the 2-dimensional dot pattern conveying encoded data, the 2-dimensional dot pattern conveying encoded data being carried by the physical object,
    in which said means for second determining operates only when said means for first determining determines state ii: that the block of captured imagery represents the physical object, thus said means for second determining operates only when the physical object is likely found amidst otherwise the static image background.

5. The system of claim 4 further comprising: means for generating a multi-color heatmap representing the 2-dimensional dot pattern conveying encoded data.

6. The system of claim 4 in which said system is operable in a condition in which said means for first determining determines state ii that the block of said captured imagery represents the physical object, and is operable in a condition in which said means for second determining determines that the block of said captured imagery depicts the 2-dimensional dot pattern conveying encoded data.

7. A non-transitory computer readable medium comprising instructions stored therein that, when executed by one or more processors, cause said one or more processors to perform the following:
    obtaining imagery depicting a physical object moved past one or more cameras comprising a field of view, in which the physical object comprises a 2-dimensional dot pattern conveying encoded data, and in which the field of view includes static image background which is occasionally interrupted by the physical object when moved past the one or more cameras;
    first determining whether a block of the imagery represents a state between two states, the two states consisting of: i) the static image background, and ii) the physical object; and
    second determining whether the block of the imagery likely depicts the 2-dimensional dot pattern conveying encoded data, the 2-dimensional dot pattern conveying encoded data being carried by the physical object, in which said second determining whether the block of the imagery likely depicts the 2-dimensional dot pattern conveying encoded data only operates when said first determining determines state ii: that the block of the imagery represents the physical object, thus said second determining operates only when the physical object is likely found amidst otherwise the static image background.

8. The non-transitory computer readable medium of claim 7 in which said instructions comprise instructions for generating a multi-color heatmap representing the 2-dimensional dot pattern conveying encoded data.

* * * * *